United States Patent
Runion

[11] Patent Number: 5,235,934
[45] Date of Patent: Aug. 17, 1993

[54] BIRD BEAK GROWTH CONTROL FEEDER

[76] Inventor: Derwood L. Runion, Rte. 2, Box 300, Timberville, Va. 22853

[21] Appl. No.: 569,430

[22] Filed: Aug. 15, 1990

[51] Int. Cl.$^5$ ............................................. A01K 39/01
[52] U.S. Cl. ............................... 119/51.01; 119/57.4; 119/18; 119/53
[58] Field of Search .................... 119/18, 26, 52.1, 53, 119/57.4, 70, 51.01, 52.2, 52.3, 57.8, 57.9, 61

[56] References Cited

U.S. PATENT DOCUMENTS

| | | | |
|---|---|---|---|
| 1,162,427 | 11/1915 | Wolff | 99/426 |
| 1,331,908 | 2/1920 | Frey | 119/18 |
| 1,425,524 | 8/1922 | Harrison | 119/26 |
| 1,850,508 | 3/1932 | Leindorf | 119/26 |
| 2,129,786 | 9/1938 | Sacre | 119/17 |
| 2,241,259 | 5/1941 | Hanson | 119/26 |
| 3,763,826 | 10/1973 | Portelli | 119/52.1 |
| 4,216,742 | 8/1980 | Kirchhofer | 119/57.4 |
| 4,627,384 | 12/1986 | Corteau | 119/26 |

FOREIGN PATENT DOCUMENTS

| | | | |
|---|---|---|---|
| 0105571 | 4/1984 | European Pat. Off. | 119/57.4 |
| 2509961 | 1/1983 | France | 119/57.4 |

Primary Examiner—Cary E. O'Connor
Assistant Examiner—Todd E. Manahan
Attorney, Agent, or Firm—Barnes & Thornburg

[57] ABSTRACT

An abrasive surface is provided on the feeding surface of a bird feeder pan. Thus as the birds eat, their beaks are abraded and trimmed. This controls the growth simultaneously with feeding the birds. The abrasive surface includes abrasive particles bonded to the feeding surface directly or may be bonded to the carrier which is adhered to the feeding surface.

21 Claims, 2 Drawing Sheets

BIRD BEAK GROWTH CONTROL FEEDER

BACKGROUND AND SUMMARY OF THE INVENTION

The present invention relates generally to bird feeders and more specifically to a bird feeder capable of beak growth control.

In their natural environment, the birds seek out materials on which to rub their beak and claws to control the growth thereof. For caged animals, a cuttlebone is usually mounted in the cage. The bird, by chipping on the bone, trims the beak and sharpens it. Some birds control their nail and beak growth by chewing and scratching on trees or wood apparatus as disclosed in U.S. Pat. No. 4,627,384 for a bird tree apparatus.

For poultry, it is important that the beaks stay trimmed such that they do not injure each other. It is a natural instinct of the birds to peck at each other with their beaks. Poultry usually use their beaks to peck on birds of lower status, size or age. This is the source of the phrase "pecking order". In the confined space that poultry is raised commercially, damage from pecking is undesirable.

For one or two domestic birds in cages, it is easy to use a cuttlebone to allow the trimming of the beak. Also, for a few number of birds, wooden structures are also applicable. But in commercial poultry raising, these two solutions become impractical.

Thus it is an object of the invention to provide a feeder which allows beak growth control.

Another object of the invention is to provide beak growth control which is an integral part of the feeding process of the birds.

These and other objects are achieved by providing an abrasive surface on the feeding surface of a bird feeder pan or any feeding surface. Thus as the birds eat, their beaks are abraded and trimmed. This controls the growth simultaneously with feeding. The abrasive includes abrasive particles bonded to the feeding surface. They may bond directly to the feeding surface or may be bonded to the carrier which is adhered to the feeding surface. The abrasive particles, maybe one or more, from the group of sand, corundum, etc. The particles are bonded using well known adhesives for example resin, thermal setting adhesives, etc.

The feeding pan may also include a drop tube for dispensing feed at its distal end into the pan. The abrasive material may also be secured to the distal end of the drop tube. The pan and drop tube may be made of plastic.

Other objects, advantages and novel features of the present invention will become apparent from the following detailed description of the invention when considered in conjunction with the accompanying drawings.

DETAILED DESCRIPTION OF THE DRAWINGS

Figure 1:
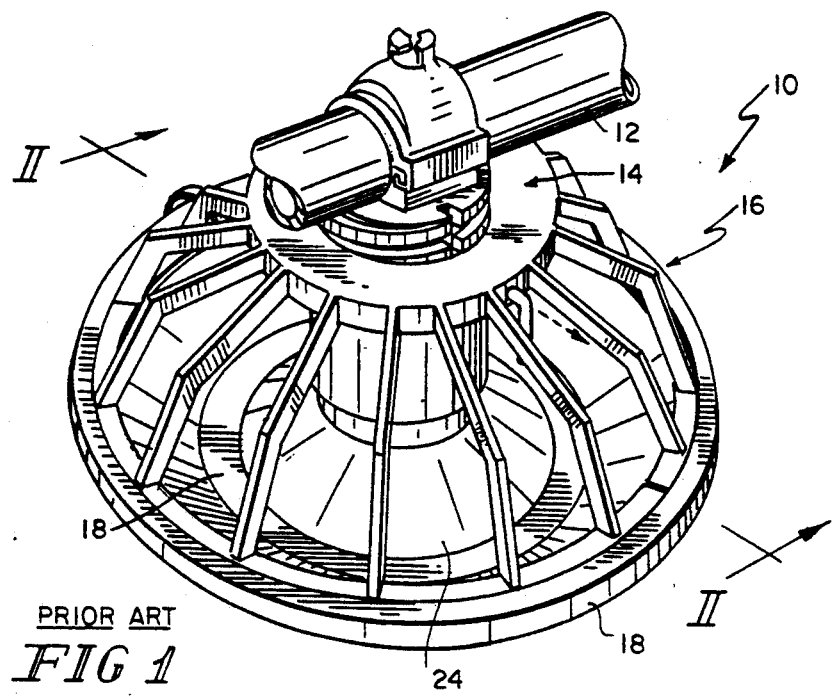
FIG. 1 is a perspective view of a feeding pan installed on a conveyor tube.
Figure 2:
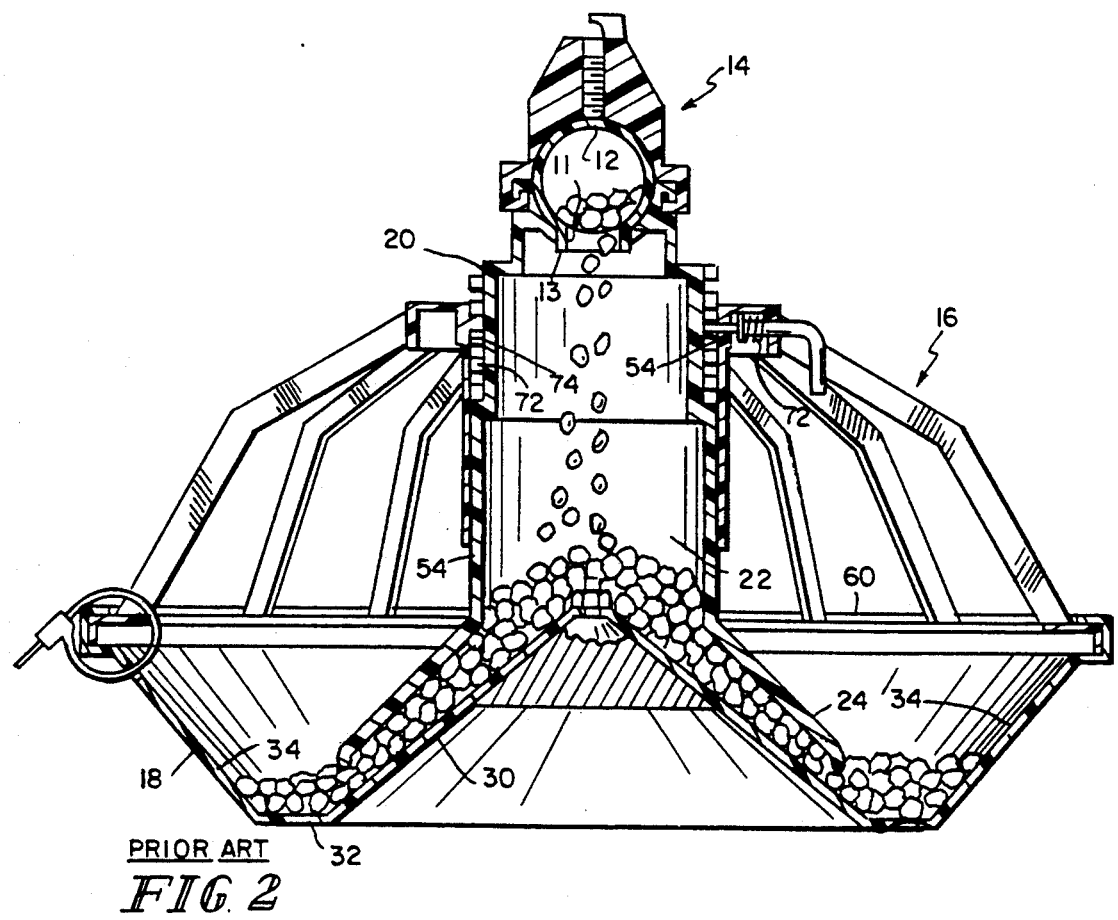
FIG. 2 is a cross-section view taken along lines II—II of FIG. 1.

As illustrated in FIGS. 1 and 2 above, feeder 10 is mounted about a conveyor tube 12 and includes a drop tube 14 for receiving the conveyor tube 12 at its proximal end and extending through a grillwork 16 to its distal end adjacent to a pan 18. The grillwork 16 is mounted to the pan 18 at its outer periphery. The drop tube 14 includes a tube 20 having an internal bore 22 and being flared at its distal end 24. The pan 18 includes a central conical portion 30 having a steep angle substantially matching the angle of the flare 24 of the drop tube 14. A narrow floor engaging portion or bottom wall 32 extends horizontal from the bottom of the central conical portion 30 and has extending up therefrom walls 34. As is well known in the industry, the distance between the distal end of the flared portion 24 of the drop tube from the bottom wall 32 and the central conical portion 30 of the pan 18 determines the repose and therefore the heighth of the material within the pan 18.

The pan of FIGS. 1 and 2 is preferably made of plastic although a portion of it may be made of aluminum or galvanized metal. As the feeding pan of FIGS. 1 and 2 is one of many prior art feeding pans, it may be used with present abrasive material. The specific pan shown is for commercial poultry feeding. Other types of pans for any kind of fowl or bird may be used within the scope of the present invention.

Figure 3:
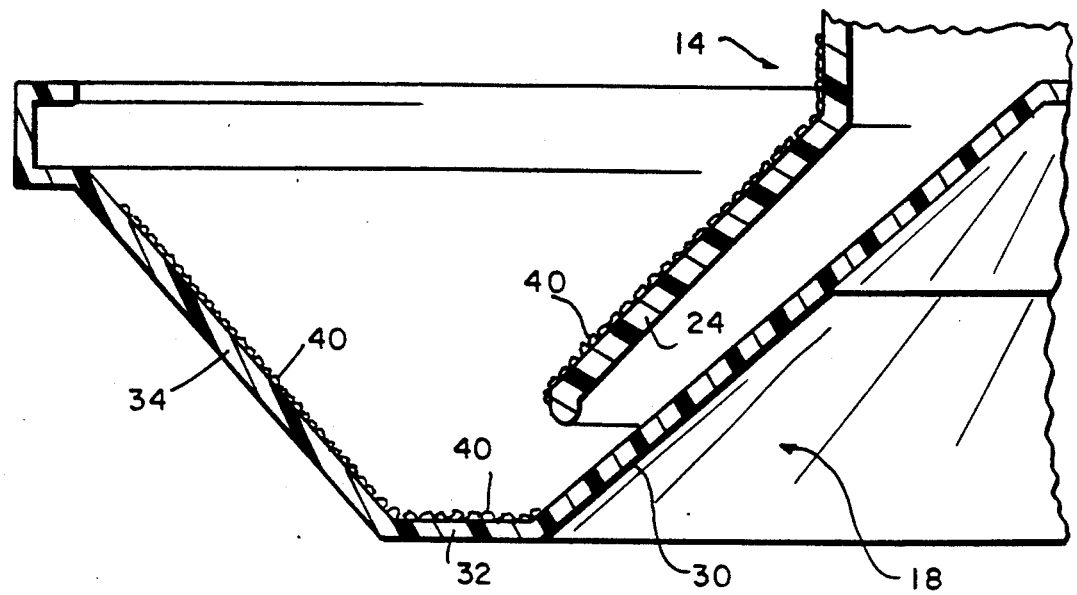
FIG. 3 is a partial view of the feeding surfaces of the pan of FIGS. 1 and 2 with an abrasive surface incorporating the principles of the present invention.

As illustrated in FIG. 2, the surface of which a feeding bird would come into contact with, would include the interior surface of walls 32 and 34 and a very small segment of the surface of cone 30. Also the exterior surface of the flange portion 24 immediately adjacent the distal end of the drop tube 14 may be a feeding surface. As shown in FIG. 3, these surfaces are covered with an abrasive material 40. Thus as the bird feeds, its beak will engage the surfaces of walls 32, 34 and possibly 24. This engagement will abrade their beaks and thereby keep them trimmed.

The abrasive material 40 may be sand and corundum, which is the material generally used in emery boards, as well as other well known abrasive materials. The important characteristic is that the abrasive materials 40 be nontoxic, since they themselves may come loose. The abrasive material 40 is bonded to the feeding surfaces by adhesive, for example resin, thermal setting adhesives, etc. They may be applied directly to the feeding surfaces during manufacture or may be applied later. If applied during manufacture, the pan 18 is dipped in or sprayed or otherwise coated with the adhesive material and then the abrasive particles are applied. Depending upon the adhesive, there may be a heating or drying step.

Figure 4:
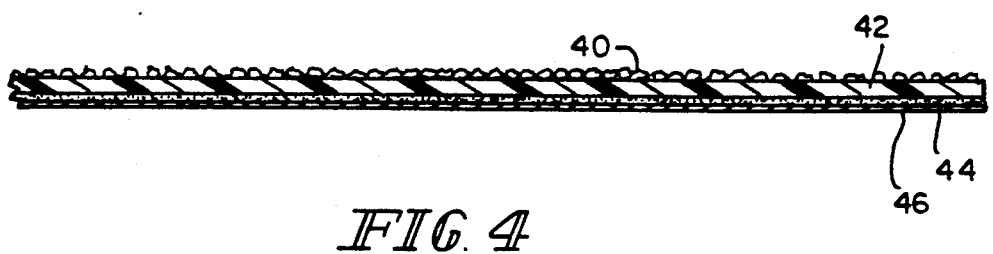
FIG. 4 is an exploded view of an abrasive material and carrier according to the principles of the present invention.

Alternatively, as illustrated in FIG. 4, the abrasives 40 may be applied to a carrier 42 which has an adhesive 44 on the back and is covered by a release strip 46. The carrier may be applied to any feeding pan by merely removing the release strip 46 and securing the carrier 42 to the feeding surfaces using adhesive 44. Also, commonly available sand paper or any other pads used for sanding or polishing may have an adhesive applied to the back to mount the pad to the feeding structure.

The carrier 42 also allows the abrasives 40 to be applied to any eating surface and contiguous surfaces. In case systems where the feed is provided in a trough as shown in U.S. Pat. No. 4,495,894 the abrasives maybe applied to the trough and contiguous surfaces. Also, the floor of a cage, poultry house or any other feeding surface maybe covered with the abrasives 40.

Thus it can be seen that by applying an abrasive material to the feeding surfaces of the feeding pan, the bird, while eating, will abrade and trim its beak. This would optimize the trimming process since the birds will trim their beaks simultaneously with feeding. Thus separate abrading areas are not needed in the living space. Even if the original abraded material 40 is bonded directly to the feeding surfaces, the carrier embodiment of FIG. 4 may be used to replace worn out abraded material on the feeding surfaces. It should also be noted by providing the abraded material, it protects the feeding surfaces and therefore extends the life of the pan. Although the abrasive material 40 has been shown as secured to a feeding pan, the abrasive material may also be provided to other feeding surfaces such as the floor of a cage or bird house or on nonfeeding surfaces.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A bird feeder comprising:
   a pan for retaining and presenting feed;
   said pan having a feeding surface to be covered by said feed;
   said pan having at least one upstanding surface; and
   abrasive means secured to said at least one upstanding surface for abrading beaks of birds as they feed.

2. A bird feeder according to claim 1 wherein said abrasive means includes abrasive particles bonded to said at least one upstanding surface.

3. A bird feeder according to claim 2 wherein said abrasive particles includes one or more from the group of sand and corundum.

4. A bird feeder according to claim 3 wherein said abrasive means includes an adhesive selected from the group of resin and thermal setting adhesives, for bonding said abrasive particles to said at least one upstanding surface.

5. A bird feeder according to claim 2 wherein said abrasive means includes an adhesive selected from the group of resin and thermal setting adhesives, for bonding said abrasive particles to said at least one upstanding surface.

6. A bird feeder according to claim 1 wherein said abrasive means includes abrasive particles bonded to a carrier and said carrier being adhered to said at least one upstanding surface.

7. A bird feeder according to claim 6 wherein said abrasive particles includes one or more from the group of sand and corundum.

8. A bird feeder according to claim 7 wherein said abrasive means includes an adhesive selected from the group of resin and thermal setting adhesives, for bonding said abrasive particles to said carrier and adhering said carrier to said at least one upstanding surface.

9. A bird feeder according to claim 6 wherein said abrasive means includes an adhesive selected from the group of resin and thermal setting adhesives, for bonding said abrasive particles to said carrier and adhering said carrier to said at least one upstanding surface.

10. A bird feeder according to claim 1 wherein:
    said pan includes a drop tube for dispensing feed at its distal end into said pan; and
    said abrasive means is also secured to the distal end of said drop tube.

11. A bird feeder according to claim 10 wherein said pan and said drop tube are made of plastic.

12. A bird feeder comprising:
    a feeding surface to be covered by feed;
    said feeding surface having at least one upstanding surface; and
    abrasive means secured to said at least one upstanding surface for abrading beaks of birds as they feed.

13. A bird feeder according to claim 12 wherein said abrasive means includes abrasive particles bonded to said at least one upstanding surface.

14. A bird feeder according to claim 13 wherein said abrasive particles includes one or more from the group of sand and corundum.

15. A bird feeder according to claim 14 wherein said abrasive means includes an adhesive selected from the group of resin and thermal setting adhesives, for bonding said abrasive particles to said at least one upstanding surface.

16. A bird feeder according to claim 13 wherein said abrasive means includes an adhesive selected from the group of resin and thermal setting adhesives, for bonding said abrasive particles to said at least one upstanding surface.

17. A bird feeder according to claim 12 wherein said abrasive means includes abrasive particles bonded to a carrier and said carrier is adhered to said at least one upstanding surface.

18. A bird feeder according to claim 17 wherein said abrasive particles includes one or more from the group of sand and corundum.

19. A bird feeder according to claim 18 wherein said abrasive means includes an adhesive selected from the group of resin and thermal setting adhesives, for bonding said abrasive particles to said carrier and adhering said carrier to said at least one upstanding surface.

20. A bird feeder according to claim 17 wherein said abrasive means includes an adhesive selected from the group of resin and thermal setting adhesives, for bonding said abrasive particles to said carrier and adhering said carrier to said at least one upstanding surface.

21. A bird feeder comprising:
    a feeding surface means for covering with feed;
    said feeding surface means having an upturned abrasive surface for abrading beaks of birds as they feed.

* * * * *